(12) United States Patent
Cho et al.

(10) Patent No.: US 9,568,770 B2
(45) Date of Patent: Feb. 14, 2017

(54) DISPLAY PANEL AND DISPLAY APPARATUS USING BIREFRINGENCE

(71) Applicant: SAMSUNG ELECTRONICS CO., LTD., Suwon-si (KR)

(72) Inventors: Hyun-seung Cho, Anyang-si (KR); Ki-hyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 803 days.

(21) Appl. No.: 13/730,026

(22) Filed: Dec. 28, 2012

(65) Prior Publication Data

US 2013/0222366 A1 Aug. 29, 2013

(30) Foreign Application Priority Data

Feb. 28, 2012 (KR) .................. 10-2012-0020332

(51) Int. Cl.
| | |
|---|---|
| *H04N 13/00* | (2006.01) |
| *G02F 1/13363* | (2006.01) |
| *G06T 15/00* | (2011.01) |
| *G02B 27/26* | (2006.01) |
| *H04N 13/04* | (2006.01) |

(52) U.S. Cl.
CPC ........... *G02F 1/13363* (2013.01); *G02B 27/26* (2013.01); *G06T 15/00* (2013.01); *H04N 13/00* (2013.01); *H04N 13/0411* (2013.01)

(58) Field of Classification Search
CPC .............................. G02F 1/13363; G06T 15/00
See application file for complete search history.

(56) References Cited

U.S. PATENT DOCUMENTS

| | | | | |
|---|---|---|---|---|
| 5,775,799 | A * | 7/1998 | Forkner ................. | F21V 5/008 362/268 |
| 2003/0214497 | A1* | 11/2003 | Morishima ........ | G02B 27/2214 345/204 |
| 2004/0240777 | A1* | 12/2004 | Woodgate .......... | G02B 27/2214 385/16 |
| 2007/0008619 | A1* | 1/2007 | Cha ..................... | G02B 27/2214 359/462 |

* cited by examiner

*Primary Examiner* — William C Vaughn, Jr.
*Assistant Examiner* — Jerry Jean Baptiste
(74) *Attorney, Agent, or Firm* — Sughrue Mion, PLLC

(57) ABSTRACT

A display panel and a display apparatus are provided. The display panel includes an image panel having pixel lines; a polarization panel which switches a polarization direction of a ray of light emitted from the image panel; and a lens which passes the ray of light provided from the polarization panel. The lens includes a first lens array which has a first birefringence characteristic, a second lens array which has a second birefringence characteristic different from the first birefringence characteristic, and which is arranged at a location to face the first lens array in an alternating manner, and a liquid crystal portion which has a same birefringence characteristic as either the first birefringence characteristic or the second birefringence characteristic, and which is filled in between the first lens array and the second lens array.

13 Claims, 11 Drawing Sheets

DISPLAY PANEL AND DISPLAY APPARATUS USING BIREFRINGENCE

CROSS-REFERENCE TO RELATED APPLICATION

This application claims priority from Korean Patent Application No. 10-2012-20332, filed on Feb. 28, 2012, in the Korean Intellectual Property Office, the disclosure of which is herein incorporated by reference in its entirety.

BACKGROUND

1. Field

Apparatuses consistent with exemplary embodiments herein relate to a display panel and a display apparatus including the display panel, and more particularly, to a display panel using a plurality of lens arrays having different birefringence characteristics from each other and a display apparatus having the display panel.

2. Description of the Related Art

With the development of electronic technologies, various types of electronic devices are being developed and provided. Specifically, the display apparatus including a displaying function are utilized in various places such as homes, offices, and companies. For instance, the television (TV), the cellular phone, the PDA, the MP3 player, the kiosk, the electronic frame, the electronic board, the electronic book, and others are utilized for displaying.

As the display apparatuses diversify and the number of the display apparatuses increases, the display apparatuses are enabled to provide a variety of contents thereon. Specifically, three-dimensional display system providing three-dimensional (3D) contents are manufactured and supplied.

The 3D display system is mainly categorized into a glassless system with which the user can watch the contents without having to wear glasses, and a glasses system with which the user can watch the contents through a pair of glasses. The glasses system discriminately provides the left-eye images and the right-eye images to the left eye and the right eye, respectively. Thus, the glasses system can provide high image quality, but the user may feel inconvenience in watching the contents with the glasses.

In the glassless system, although the user can watch the 3D images without having to wear the glasses, the image quality may be lower and the user may sense different depths depending on a location from which the display is viewed.

Particularly, in the glassless system, due to the way the left-eye and right-eye images are provided, the horizontal image resolution can decrease about half.

Accordingly, the glassless system has a disadvantage that it is not possible to watch the contents in the original resolution.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept is not required to overcome any of the disadvantages described above.

It is an aspect to provide a display panel capable of preventing degradation of horizontal image resolution by using a plurality of lens arrays having different birefringence characteristics and a display apparatus having the same.

According to an aspect of an exemplary embodiment, there is provided a display panel that includes an image panel which includes a plurality of pixel lines; a polarization panel which switches a polarization direction of a ray of light emitted from the image panel; and a lens which passes the ray of light provided from the polarization panel, and which comprises a first lens array which has a first birefringence characteristic, a second lens array which has a second birefringence characteristic different from the first birefringence characteristic, and which is arranged at a location to face the first lens array in an alternating manner, and a liquid crystal portion which has a same birefringence characteristic as either the first birefringence characteristic or the second birefringence characteristic, and which is filled in between the first lens array and the second lens array.

The first lens array may pass a ray of light having a first polarization direction, and refract a ray of light having a second polarization direction perpendicular to the first polarization direction, and the second lens array may pass the ray of light having the second polarization direction, and refract the ray of light having the first polarization direction.

The first lens array may include a plurality of first lens areas, each having a size and a shape corresponding to two of the plurality of pixel lines, each of the first lens areas distinguished from an adjacent first lens area by a trench, and the second lens array may comprise a plurality of second lens areas rounded outward toward a direction of the first lens array, the second lens areas being arranged so that centers of the plurality of second lens areas are located to correspond respectively to the trenches of the first lens array.

The first lens array may include a plurality of first lens areas, each having a size and a shape corresponding to two of the plurality of pixel lines, each of the first lens areas distinguished from an adjacent first lens area by a trench, and the second lens array may comprise a plurality of second lens areas rounded inward toward a direction away from the first lens array, is the second lens areas being arranged so that centers of the plurality of second lens areas are located to correspond respectively to the trenches of the first lens array.

According to an aspect of another exemplary embodiment, there is provided a display apparatus including an input which receives a select signal; an image processor which operates in either a two-dimensional (2D) mode or a three-dimensional (3D) mode to generate an image frame, in accordance with the select signal; and a display panel which displays the image frame, and which comprises an image panel which comprises a plurality of pixel lines; a polarization panel which switches a polarization direction of a ray of light emitted from the image panel; and a lens which passes the ray of light provided from the polarization panel, using a first lens array or a second lens array, the first lens array and the second lens array having different birefringence characteristics, and a liquid crystal portion filled in between the first lens array and the second lens array.

The second lens array may be arranged at a location to face the first lens array in an alternating manner, and the liquid crystal portion may have birefringence characteristic identical to that of the first lens array or the second lens array.

The first lens array may include a plurality of first lens areas, each having a size and a shape corresponding to two of the plurality of pixel lines, each of the first lens areas distinguished from an adjacent first lens area by a trench, and the second lens array may comprise a plurality of second lens areas rounded outward toward a direction of the first lens array, the second lens areas being arranged so that centers of the plurality of second lens areas are located to correspond respectively to the trenches of the first lens array.

The first lens array may include a plurality of first lens areas, each having a size and a shape corresponding to two of the plurality of pixel lines, each of the first lens areas distinguished from an adjacent first lens area by a trench, and the second lens array may comprise a plurality of second lens areas rounded inward toward a direction away from the first lens array, is the second lens areas being arranged so that centers of the plurality of second lens areas are located to correspond respectively to the trenches of the first lens array.

The image processor in the 3D mode may divide a left-eye image frame and a right-eye image frame into odd-numbered lines and even-numbered lines, respectively, combine the odd-numbered lines of the divided left-eye image frame with the even-numbered lines of the right-eye image frame to generate a first 3D frame, combine the even-numbered lines of the left-eye image frame with the odd-numbered line of the right-eye image frame to generate a second 3D frame, and provide the first 3D frame and the second 3D frame to the image panel in sequence.

The image processor in the 2D mode may divide an image frame of 2D content into odd-numbered lines and even-numbered lines, generate a first 2D frame by pairing the odd-numbered lines of the image frame, generate a second 2D frame by pairing the even-numbered lines of the image frame and arranging on and afterward the second pixel line, and provide the first 2D frame and the second 2D frame to the image panel in sequence, and the image panel displays the first 2D frame and the second 2D frame in sequence.

When the first 3D frame or the first 2D frame is displayed on the image panel, the polarization panel may be turned on to pass the ray of light having a first polarization direction, and when the second 3D frame or the second 2D frame is displayed on the image panel, the polarization panel may be turned off to pass the ray of light having a second polarization direction which is perpendicular to the first polarization direction.

Further, the first lens array may pass a ray of light having a first polarization direction and refract a ray of light having a second polarization direction, and the second lens array may pass the ray of light having the second polarization direction and refract the ray of light having the first polarization direction.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
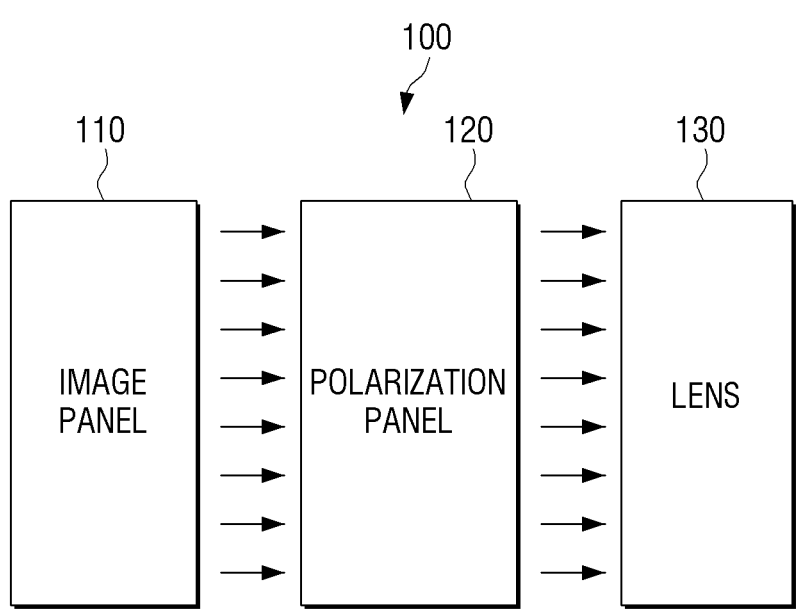
FIG. 1 is a block diagram of a display panel according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a block diagram of a display panel according to an exemplary embodiment.

Referring to FIG. 1, the display panel 100 may include an image panel 110, a polarization panel 120, and a lens 130.

The image panel 110 may include a plurality of pixel lines. As used herein, the 'pixel line' may refer to a line in which a plurality of pixels is aligned. The pixel line may be constructed vertically, but the construction is not limited thereto. The image panel 110 may include a rear polarizer (not illustrated), an liquid crystal display (LCD) panel (not illustrated), and a front polarizer (not illustrated). The rear polarizer may be a vertical polarizer, and the front polarizer may be a horizontal polarizer, or vice versa. The front polarizer only permits light in a specific polarization direction from among the white light provided from the backlight (not illustrated). After passing through the polarizer, the light passes through the LCD panel, with either changing or keeping the polarization direction depending on the liquid crystal arrangement. The front polarizer passes the light in the polarization direction perpendicular to the rear polarizer. Accordingly, the light, which changes polarization direction as passing through the LCD panel, arrives at the LCD panel, passes through the front polarizer and reaches the polarization panel 120, while the light, which passes through the LCD panel in the same direction, is blocked by the front polarizer. The image panel 110 drives the pixels within the respective pixel lines of the LCD panel according to the pixel values of the respective pixels of the image frame to be displayed.

The polarization panel 120 switches the polarization direction of the light emitted from the image panel 110. To be specific, the polarization panel 120 in a turn-on state emits light in the same polarization direction as the polarization direction of the incident light. On the contrary, the polarization panel 120 in a turn-off state switches the polarization direction of the incident light. That is, if the light in a first polarization direction is entered, the polarization panel 120 emits light in a second polarization direction which is perpendicular to the first polarization direction.

The lens 130 passes the light provided from the polarization panel 120. The lens 130 includes a plurality of lens arrays having different birefringence characteristics. The 'birefringence characteristic' denotes the characteristic of passing the light in a specific polarization direction (i.e., ordinary ray), while refracting light in a polarization direction perpendicular to the ordinary ray (i.e., extraordinary ray). By way of example, the lens may include a first lens array which passes the light in the first polarization direction and refracts the light in the second polarization direction perpendicular to the first polarization direction, and a second lens array which passes the light in the second polarization direction and refracting the light in the first polarization direction.

The polarization panel 120 is turned on or off to change the polarization direction, when the image panel 110 displays an image frame. Accordingly, the light in the changed polarization direction is refracted at the first or second lens array to be impinged on the left or right eye of the viewer.

Figure 2:
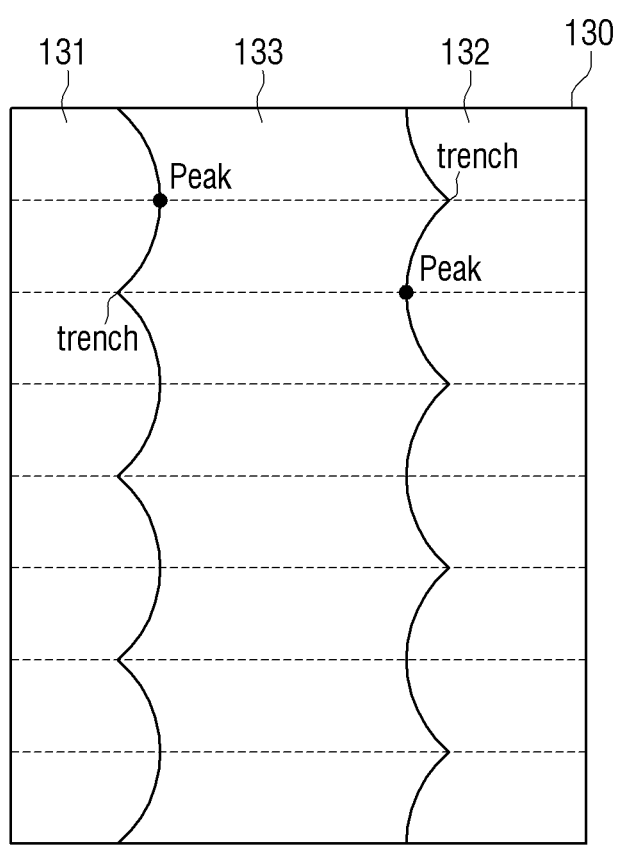
FIGS. 2 and 3 are diagrams illustrating a lens according to an exemplary embodiment.

FIG. 2 illustrates an example of the lens 130 according to an exemplary embodiment. Referring to FIG. 2, the lens 130 includes a first lens array 131, a second lens array 132, and a Liquid crystal layer 133 filled therebetween. The first lens array 131 has a first birefringence characteristic, and the second lens array 132 has a second birefringence characteristic. The second lens array 132 is arranged at a location to face the first lens array 131 in an alternating manner. That is, the second lens array 132 faces the first lens array 131 such that a peak of the second lens array 132 corresponds to a trench of the first lens array 131 and vice versa.

The first lens array 131 includes a plurality of first lens areas. The first lens areas each may have a size and a shape corresponding to two of the plurality of pixel lines of the image panel 110. The first lens areas are distinguished from each other by trenches. The first lens areas are rounded outward (i.e., in a direction toward the second lens array 132) and have peaks formed at the centers thereof.

The second lens array 132 includes a plurality of second lens areas rounded outward (i.e., in a direction toward the first lens array 131). The second lens array 132 is arranged so that the centers, i.e., peaks of the plurality of second lens areas are located to correspond to the trenches of the first lens array.

The liquid crystal layer 133 has the same birefringence characteristic as that of either the first lens array 131 or the second lens array 132. That is, the liquid crystal layer 133 may have the first birefringence characteristic or the second birefringence characteristic.

Figure 3:
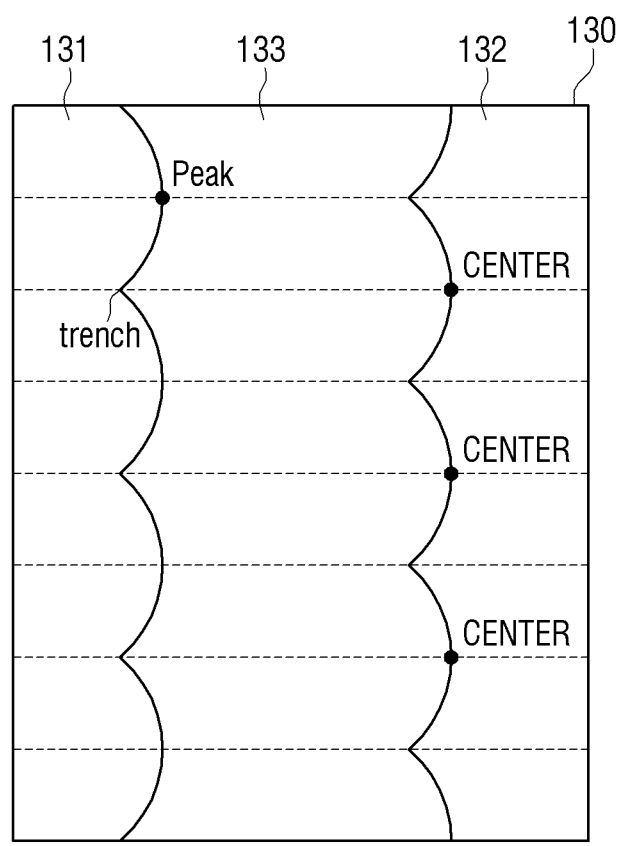

FIG. 3 illustrates an example of the lens 130 according to another exemplary embodiment. Referring to FIG. 3, the lens 130 includes a first lens array 131, a second lens array 132, and a liquid crystal layer 133 filled therebetween. The first lens array 131 has the first birefringence characteristic, and the second lens array 132 has the second birefringence characteristic.

The second lens array 132 is arranged at a location to face the first lens array 131 in an alternating manner. The second lens array 132 includes a plurality of second lens areas rounded in a direction away from the first lens array 131. The second lens array 132 may be arranged at a location where centers of the plurality of second lens areas correspond to the trenches of the first lens array, respectively.

As explained above, the first lens array 131 and the second lens array 132 may be arranged in various patterns.

Figure 4:
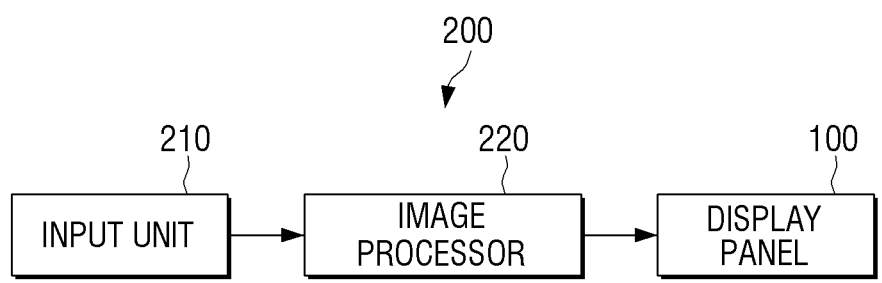
FIG. 4 is a block diagram of a display apparatus according to an exemplary embodiment.

FIG. 4 is a block diagram of a display apparatus according to an exemplary embodiment. Referring to FIG. 4, the display apparatus 200 includes an input unit 210, an image processor 220, and a display panel 100. The display apparatus 200 of FIG. 4 may be implemented as a variety of apparatuses including, for example, a TV, a mobile phone, a PDA, an MP3 player, a kiosk, an electronic frame, an electronic board, or an electronic book.

The input unit 210 receives a user select signal. The user select signal may be input through a remote controller, or through a key or a touch screen provided on a main body of the display apparatus 100.

The image processor 220 operates in either 2D or 3D mode in accordance with the user select signal, and generates image frames. To be specific, the image processor 220 may separate video data from the input content data, decode the separated video data, and scale the resultant data to suit the screen size. The image processor 220 may additionally perform frame rate conversion. Since the image processing processes are known, detailed description thereof will be omitted for the sake of brevity.

In 2D mode, image frames of 2D content are output, and image frames of 3D content are output in 3D mode. The image processor 220 in the 2D mode divides the image frame of the 2D content into odd-numbered lines and even-numbered lines, and generates the first frame and the second frame by combining the divided lines. Further, the image processor 220 in the 3D mode divides the left-eye image frame and the right-eye image frame of the 3D content into a plurality of lines, and generates the first frame and the second frame by combining the divided lines.

The display panel 100 sequentially displays the first frame and the second frame generated at the image processor 220. The display panel 100 may include an image panel which is divided into a plurality of pixel lines, a polarization panel which switches the polarization direction of the light emitted from the image panel, and a lens which passes the light emitted from the polarization panel. The display panel 100 may include all the components illustrated in FIG. 1. The lens may be a lens as illustrated in FIG. 2 or FIG. 3.

Although FIG. 4 illustrates the input unit 210, the image processor 220 and the display panel 100 only, an embodiment is not limited to only this arrangement. Therefore, one of ordinary skill in the art will understand that the display apparatus 200 may additionally include other components for performing displaying. By way of example, the display apparatus 200 may have a function of receiving broadcast signal, and may additionally include a tuner (not illustrated), a demodulator (not illustrated), or a synchronizer (not illustrated) in that case. Further, the display apparatus 200 may include a backlight (not illustrated), or a backlight driving circuit (not illustrated) as well. The explanation of these other components will be omitted for the sake of convenience of explanation.

Figure 5:
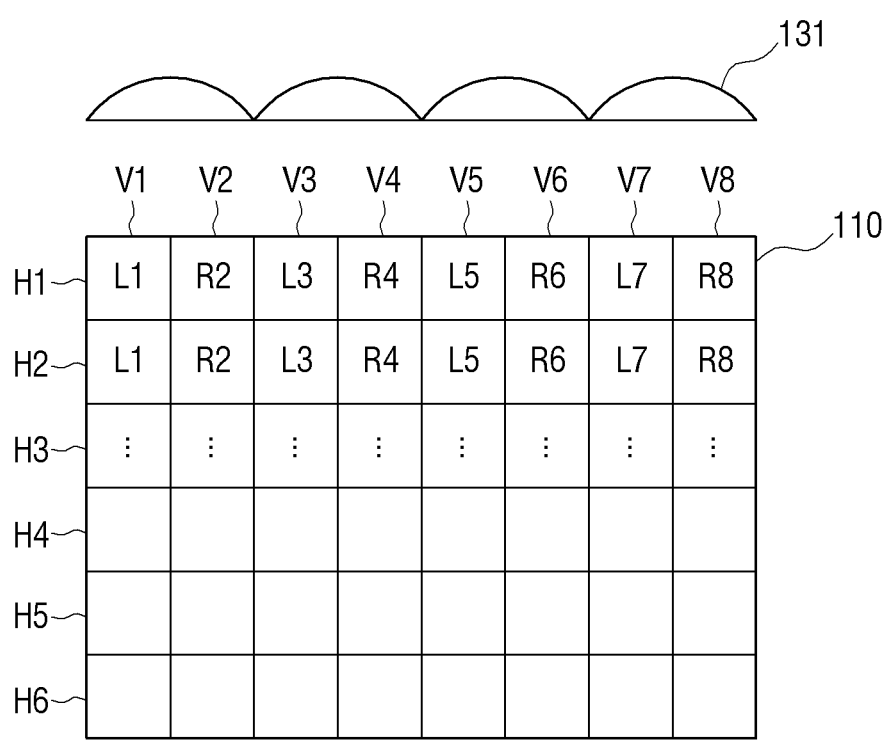
FIGS. 5 and 6 are diagrams provided to explain the operation of an image panel in the 3D mode according to an exemplary embodiment.
Figure 6:
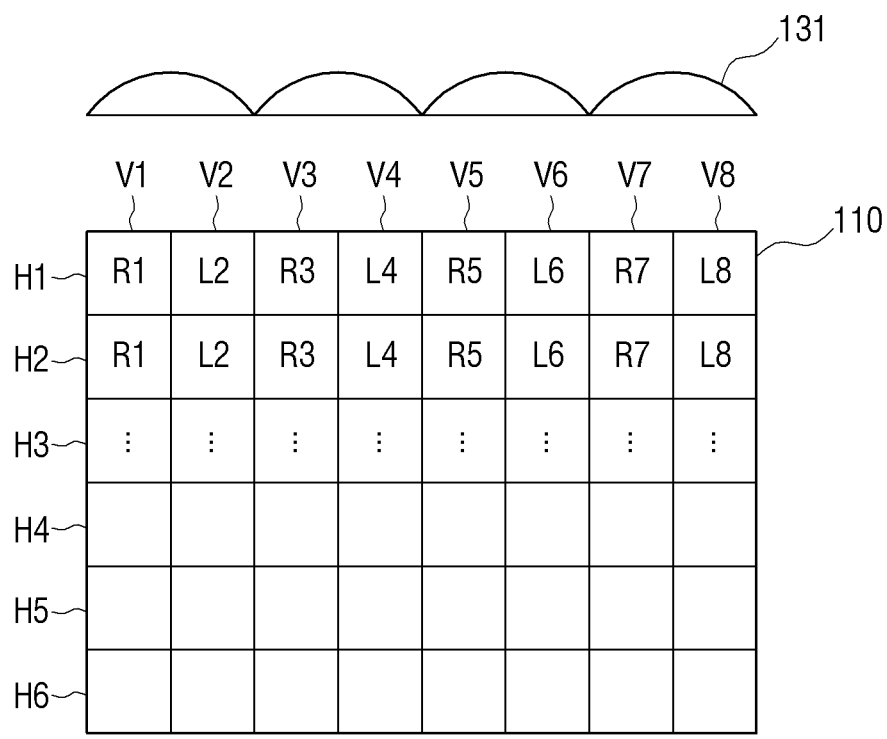

FIGS. 5 and 6 are provided to explain the operation of the image panel 110 in the 3D mode.

In the 3D mode, the image processor 220 divides the left-eye image frame and the right-eye image frame into odd-numbered lines and even-numbered lines, respectively. The image processor 220 then combines the odd-numbered lines of the divided left-eye image frame with the even-numbered lines of the right-eye image frame to generate a first 3D frame, and combines the even-numbered lines of the left-eye image frame with the odd-numbered line of the right-eye image frame to generate a second 3D frame. The image processor 220 provides the generated first 3D frame and the generated second 3D frame to the image panel 110 in sequence.

FIG. 5 illustrates the first 3D frame. Referring to FIG. 5, the odd-numbered lines (L1, L3, L5, L7) of the left-eye image frame, and the even-numbered lines (R2, R4, R6, R8) of the right-eye image frame are combined with each other to form a first 3D frame. Lines L1, R2 correspond to the first lens area of the first lens array 131, and lines L3 and R4, L5 and R6, L7 and R8 correspond to the second lens area, the third lens area, and the fourth lens area, respectively. The image panel 110 displays the first 3D frame using the pixels arranged in the respective rows (H1~H6) and columns (V1~V8).

FIG. 6 illustrates the second 3D frame. Referring to FIG. 6, the even-numbered lines L2, L4, L6, L8 of the left-eye image frame and the odd-numbered lines R1, R3, R5, R7 of the right-eye image frame are combined with each other to form the second 3D frame.

Figure 7:
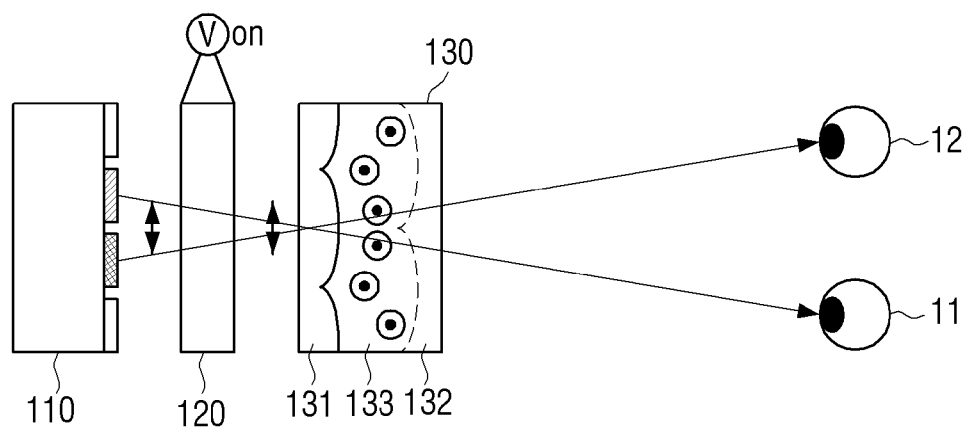
FIGS. 7 and 8 are diagrams provided to explain the operation of a polarization panel and a lens in 3D mode according to an exemplary embodiment.
Figure 8:
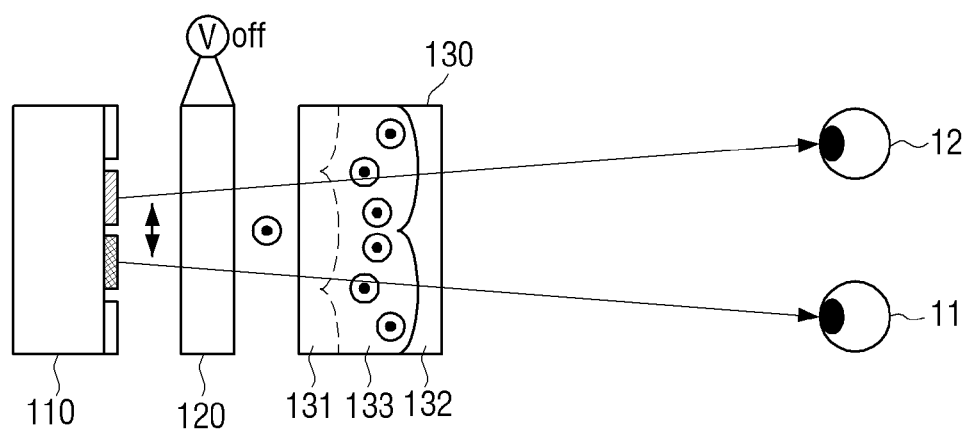

FIG. 7 illustrates the operation of the polarization panel 120 when the first 3D frame is displayed, and FIG. 8 illustrates the operation of the polarization panel 120 when the second 3D frame is displayed. Although FIGS. 7 and 8 illustrate the lens 130 as the lens illustrated in FIG. 3, an embodiment is not limited thereto. For example, the lens arrangement of FIG. 2 may alternatively be used.

Referring to FIGS. 7 and 8, the polarization panel 120 is turned on when the first 3D frame is displayed, and turned off when the second 3D frame is displayed.

As shown in FIG. 7, as the first 3D frame is displayed and the light in the first polarization direction ($\updownarrow$) is emitted, the light does not change the polarization direction at the polarization panel 120, but directly passes therethrough since the polarization panel 120 is turned on. The light in the first polarization direction is refracted by the first lens array 131, and enters the left eye 11 and the right eye 12, respectively. That is, the odd-numbered lines L1, L3, L5, L7 in the first 3D frame enter the left eye 11, and the even-numbered lines R2, R4, R6, R8 in the first 3D frame enter the right eye 12.

Meanwhile, as shown in FIG. 8, as the second 3D frame is displayed and the light in the first polarization direction ($\updownarrow$) is emitted, the light changes the polarization direction at the polarization panel 120 to the second polarization direction (⊚, also shown in FIG. 8 as a double circle with the inside circle filled) since the polarization panel 120 is turned off. The light in the second polarization direction is refracted by the second lens array 132, and enters the left eye 11 and the right eye 12, respectively. That is, the odd-numbered lines R1, R3, R5, R7 in the second 3D frame enter the right eye 12, and the even-numbered lines L2, L4, L6, L8 in the second 3D frame enter the left eye 11.

As a result, the left eye 11 sees the left-eye image containing L1 to L8, and the right eye 12 sees the right-eye image containing R1 to R8.

Figure 9:
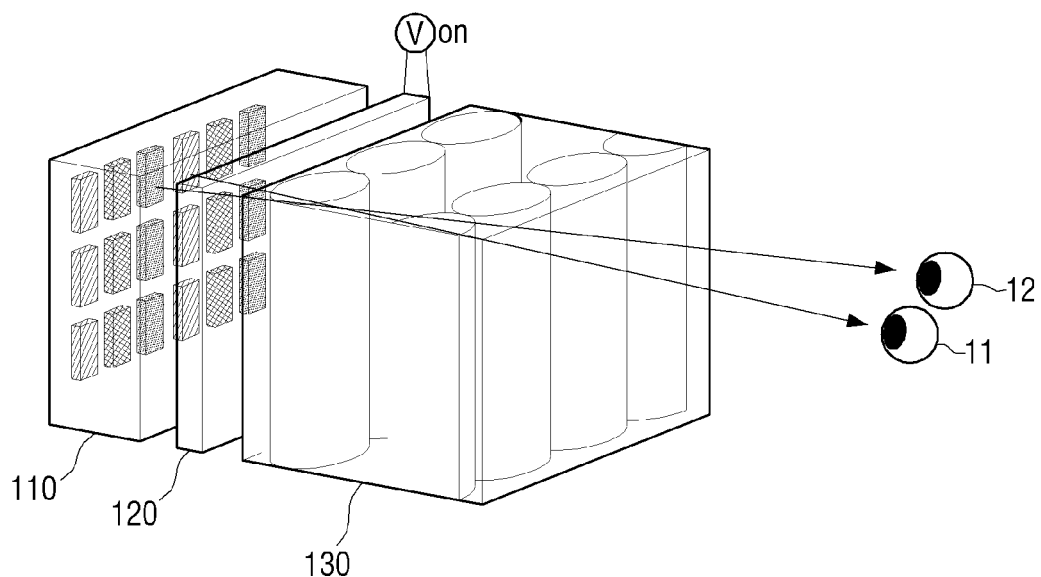
FIGS. 9 and 10 are diagrams provided to explain the operation of a display apparatus in 3D mode according to an exemplary embodiment.
Figure 10:
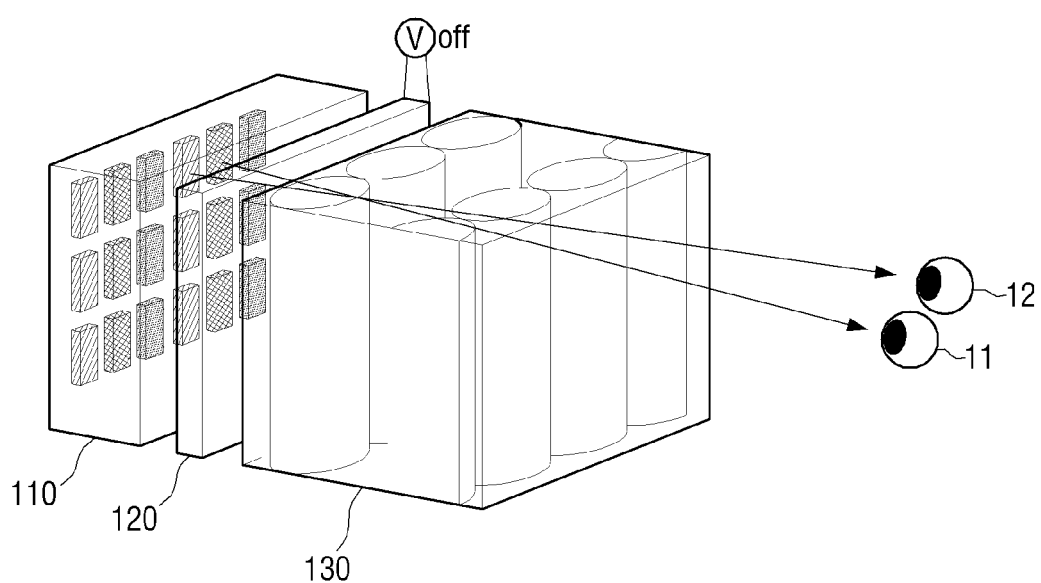

FIGS. 9 and 10 illustrate FIGS. 7 and 8 three-dimensionally. Referring to FIG. 9, the light emitted from the left-eye image pixel of displaying the left-eye image lines of the first 3D frame is refracted while the light passes the lens 130, and enters the left eye 11. The light emitted from the right-eye image pixels of displaying the right-eye image is refracted as the light passes the lens 130 and enters the right eye 12. Referring to FIG. 10, the light emitted from the left-eye image pixels of displaying the left-eye image lines of the second 3D frame is refracted as the light passes the lens 130 and enters the left eye 11, and the light emitted from the right-eye image pixels of displaying the right-eye image lines is refracted as the light passes the lens 130 and enters the right eye 12.

Referring to FIGS. 9 and 10, the lens areas of the first lens array 131 and the second lens array 132 are illustrated each in the shape of a cylindrical column. However, an embodiment is not limited to the specific example only. For example, the first lens array 131 and the second lens array 132 may take the form illustrated in FIG. 2 or FIG. 3.

Figure 11:
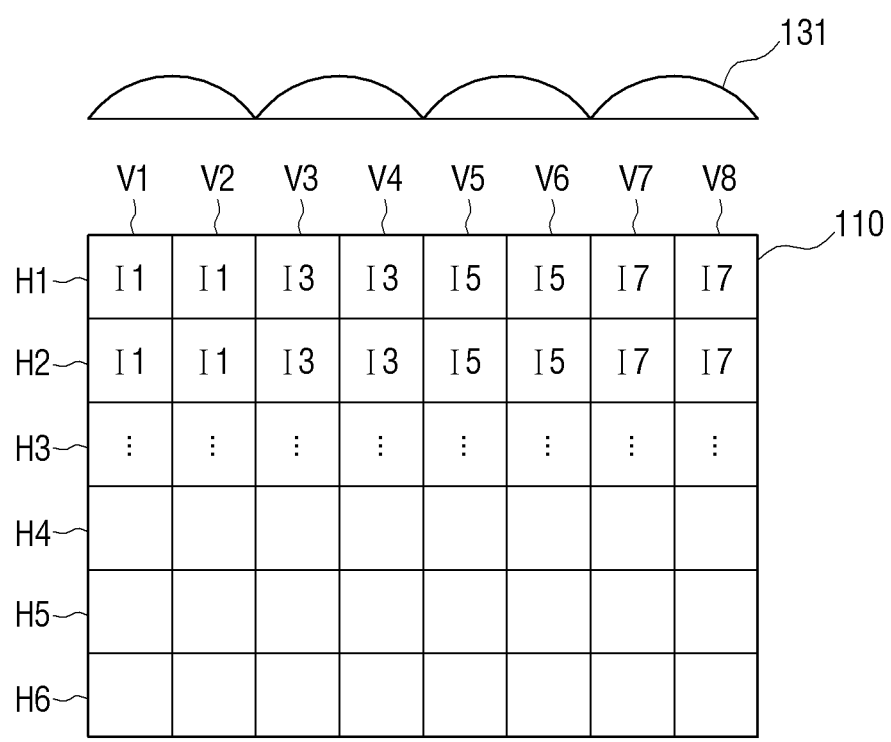
FIGS. 11 and 12 are diagrams provided to explain the operation of an image panel in 2D mode according to an exemplary embodiment.
Figure 12:
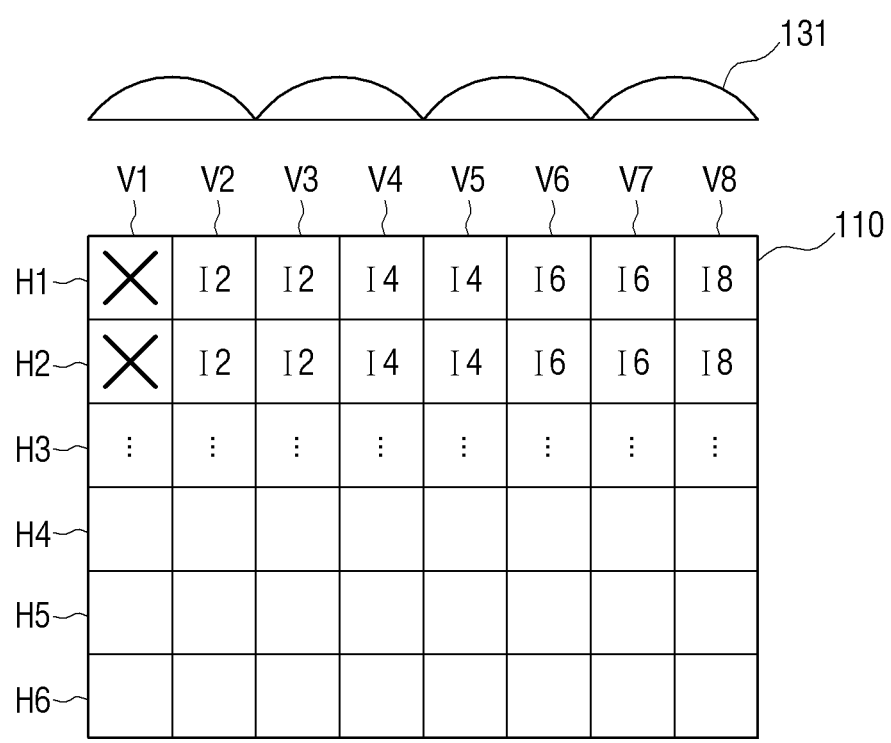

FIGS. 11 and 12 are views provided to explain the operation of the image panel in the 2D mode. In the 3D mode, the image processor 220 divides the image frame of the 2D content into odd-numbered lines and even-numbered lines. The image processor 220 then generates a first 2D frame by pairing the divided odd-numbered lines, and arranging at the location of the first pixel line of the image panel 110 and onward. Referring to FIG. 11, the image processor 220 generates a first 2D frame including lines I1, I1, I3, I3, I5, I5, I7, I7 using the odd-numbered lines I1, I3, I5, I7.

The image processor 220 then pairs the even-numbered lines of the image frame of the 2D content, and generates a second 2D frame by arranging from the second pixel line (i.e., excluding the first pixel line). Referring to FIG. 12, a pixel value is not assigned to the V1 line, but the pixel values I2, I2, I4, I4, I6, I6, I8 are assigned to the V2 line and onward.

The image panel 110 displays the first 2D frame and the second 2D frame illustrated in FIGS. 11 and 12 in sequence. As a result, the pixel values are not expressed in the first pixel line and the last pixel line.

Figure 13:
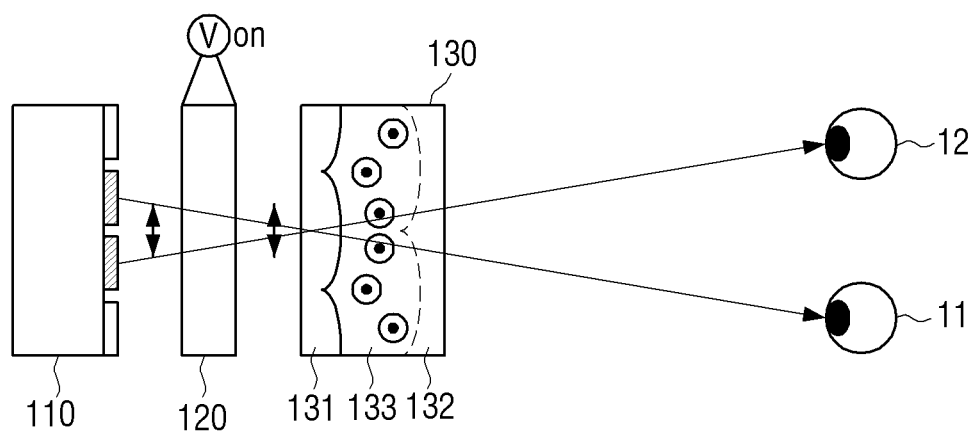
FIGS. 13 and 14 are diagrams provided to explain the operation of a polarization panel and a lens in 2D mode according to an exemplary embodiment.
Figure 14:
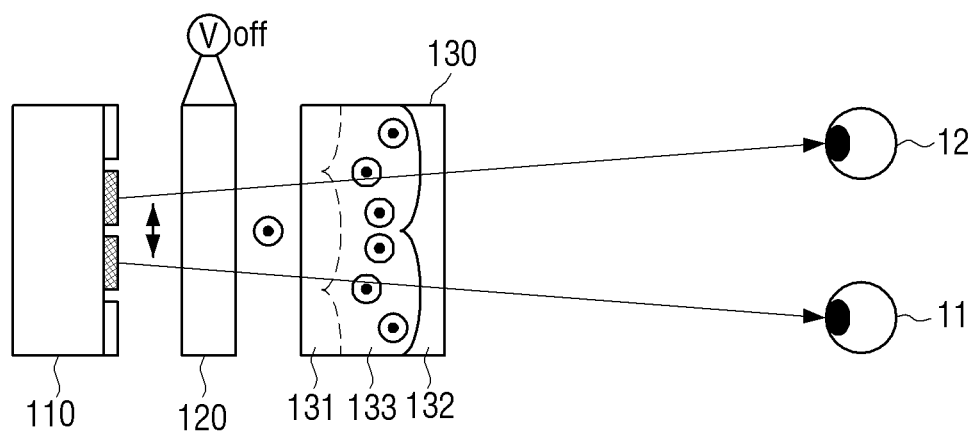

FIGS. 13 and 14 are views provided to explain the operation of the polarization panel and the lens when the image panel 110 operates in 2D mode as illustrated in FIGS. 11 and 12.

Referring to FIG. 11, the polarization panel 120 is turned on when the first 2D frame is displayed on the image panel 110. Accordingly, the light emitted from the respective pixel lines is maintained in the same polarization direction, and refracted at the first lens array 131. As a result, the odd-numbered lines of the frames of the 2D contents are perceived at the left eye 11 and the right eye 12, respectively.

Next, referring to FIG. 12, the polarization panel 120 is turned off when the image panel 110 displays the second 2D frame. Accordingly, the polarization direction ($\updownarrow$) of the light emitted from the respective pixel lines is changed to different polarization direction (⊚, also shown in FIG. 14 as a double circle with the inside circle filled). The light in the changed polarization direction is refracted at the second lens array 132 in the lens 130 and enters the left eye 11 and the right eye 12 of the viewer. As a result, the even-numbered lines of the frame of the 2D content enter the left eye 11 and the right eye 12, respectively. As the entering lines are combined with the odd-numbered lines perceived at the time of displaying previous frame, the entire frame is perceived. Although there is a display time difference between the two frames, the eyes of the viewer barely sense such a difference. Accordingly, the viewer sees one frame.

In the exemplary embodiments explained above, if the original output frequency of the image panel 110 is 60 Hz, the image panel 110 displays the first 3D frame and the second 3D frame, or the first 2D frame and the second 2D frame at 120 Hz, respectively. Accordingly, the two frames can be displayed for the duration of time in which one original frame is displayed.

As explained above, since it is possible to distribute the light of the respective pixel lines into left and right eyes by using a plurality of lens arrays having different birefringence characteristics, degradation of horizontal resolution can be prevented.

Meanwhile, the 2D and 3D contents processed at the display apparatus may be provided from a variety of sources. By way of example, a broadcasting signal may be received from a broadcasting station through broadcast network. Alternatively, data packets may be received from web server connected via the Internet or from external devices. Alternatively, data may be read out from a storage provided in the display apparatus or from a storage device connected to the display apparatus, or played back from a DVD, or Blu-ray disc player (BDP) connected to the display apparatus.

To explain a display method of the display apparatus briefly, the display apparatus receives content, and determines a current mode. If it is determined that the current mode is 3D mode, the display apparatus generates the first 3D frame and the second 3D frame with respect to each of the frames of the content, in the manner explained above. The display apparatus then alternately displays the first 3D frame and the second 3D frame, and alternately turns on/off the polarization panel 120.

Meanwhile, if it is determined that the current mode is the 2D mode, the display apparatus processes the content to generate the first 2D frame and the second 2D frame of each of the frames of the content, in the manner explained above. The display apparatus then alternately displays the first 2D frame and the second 2D frame, and alternately turns on/off the polarization panel 120.

As a result, the display apparatus can provide 2D and 3D contents almost without compromising the horizontal image resolution.

The foregoing exemplary embodiments and advantages are merely exemplary and are not to be construed as limiting the present inventive concept. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A display apparatus comprising:
an input unit which receives a select signal;
an image processor which operates in either a two-dimensional (2D) mode or a three-dimensional (3D) mode to generate an image frame, in accordance with the select signal; and
a display panel which displays the image frame, the display panel comprising:
an image panel which comprises a plurality of pixel lines;
a polarization panel which switches a polarization direction of a ray of light emitted from the image panel; and
a lens which passes the ray of light provided from the polarization panel, using a first lens array or a second lens array, the first lens array and the second lens array having different birefringence characteristics, and a liquid crystal portion filled in between the first lens array and the second lens array,
wherein the second lens array is arranged at a location to face the first lens array in an alternating manner,
wherein the liquid crystal portion has a birefringence characteristic identical to that of one of the first lens array and the second lens array,
wherein the image processor, in the 3D mode, divides a left-eye image frame and a right-eye image frame into odd-numbered lines and even-numbered lines, respectively, combines the odd-numbered lines of the divided left-eye image frame with the even-numbered lines of the right-eye image frame to generate a first 3D frame corresponding to the first lens array, combines the even-numbered lines of the left-eye image frame with the odd-numbered line of the right-eye image frame to generate a second 3D frame corresponding to the second lens array, and provides the first 3D frame and the second 3D frame to the image panel in sequence, and
wherein when the first 3D frame is displayed on the image panel, the polarization panel is turned on to pass a ray of light having a first polarization direction, and when the second 3D frame is displayed on the image panel, the polarization panel is turned off to pass a ray of light having a second polarization direction which is perpendicular to the first polarization direction.

2. The display apparatus of claim 1, wherein
the first lens array comprises a plurality of first lens areas, each having a size and a shape corresponding to two of the plurality of pixel lines, each of the first lens areas distinguished from an adjacent first lens area by a trench, and
the second lens array comprises a plurality of second lens areas rounded outward toward a direction of the first lens array, the second lens areas being arranged so that centers of the plurality of second lens areas are located to correspond respectively to the trenches of the first lens array.

3. The display apparatus of claim 1, wherein:
the first lens array comprises a plurality of first lens areas, each having a size and a shape corresponding to two of the plurality of pixel lines, each of the first lens areas distinguished from an adjacent first lens area by a trench, and
the second lens array comprises a plurality of second lens areas rounded inward toward a direction away from the first lens array, is the second lens areas being arranged so that centers of the plurality of second lens areas are located to correspond respectively to the trenches of the first lens array.

4. The display apparatus of claim 1, wherein the image processor in the 2D mode divides an image frame of 2D content into odd-numbered lines and even-numbered lines, generates a first 2D frame by pairing the odd-numbered lines of the image frame, generates a second 2D frame by pairing the even-numbered lines of the image frame and arranges the paired lines of the second 2D frame from the second pixel line, and provides the first 2D frame and the second 2D frame to the image panel in sequence, and the image panel displays the first 2D frame and the second 2D frame in sequence.

5. The display apparatus of claim 4, wherein, when the first 3D frame or the first 2D frame is displayed on the image panel, the polarization panel is turned on to pass a ray of light having the first polarization direction, and when the second 3D frame or the second 2D frame is displayed on the image panel, the polarization panel is turned off to pass a ray of light having the second polarization direction which is perpendicular to the first polarization direction.

6. The display apparatus of claim 5, wherein the first lens array passes the ray of light having the first polarization direction and refracts the ray of light having the second polarization direction, and
the second lens array passes the ray of light having the second polarization direction and refracts the ray of light having the first polarization direction.

7. A display apparatus comprising:
a display panel comprising:
a polarization panel which switches a polarization direction of a ray of light passing therethrough;
a lens comprising:
a first lens array which has a first polarization direction, a second lens array which has a second polarization direction different from the first polarization direction, and liquid crystal which has a same polarization direction as either the first polarization direction or the second polarization direction, and which is filled in between the first lens array and the second lens array; and an image processor which selectively controls the polarization panel to switch the polarization direction in correspondence with the first polarization direction or the second polarization direction wherein the image processor controls the polarization panel to display an image in a three-dimensional (3D) mode or a two-dimensional (2D) mode, and, in the 3D mode, the image processor divides a left-eye image frame and a right-eye image frame into odd-numbered lines and even-numbered lines, respectively, combines the odd-numbered lines of the divided left-eye image frame with the even-numbered lines of the right-eye image frame to generate a first 3D frame corresponding to the first lens array, combines the even-numbered lines of the left-eye image frame with the odd-numbered line of the right-eye image frame to generate a second 3D frame corresponding to the second lens array, and provides the first 3D frame and the second 3D frame to the display panel in sequence, and wherein when the first 3D frame is displayed on the image panel, the polarization panel is turned on to pass a ray of light having the first polarization direction, and when the second 3D frame is displayed on the image panel, the polarization panel is turned off to pass a ray of light having the second polarization direction which is perpendicular to the first polarization direction.

8. The display apparatus of claim 7, wherein the second lens array is arranged at a location to face the first lens array in an alternating manner.

9. The display apparatus of claim 8, wherein:

the display panel further comprises an image panel which comprises a plurality of pixel lines;

the first lens array comprises a plurality of first lens areas, each having a size and a shape corresponding to two of the plurality of pixel lines, each of the first lens areas distinguished from an adjacent first lens area by a trench, and the second lens array comprises a plurality of second lens areas rounded outward toward a direction of the first lens array, the second lens areas being arranged so that centers of the plurality of second lens areas are located to correspond respectively to the trenches of the first lens array.

10. The display apparatus of claim 8, wherein:

the display panel further comprises an image panel which comprises a plurality of pixel lines;

the first lens array comprises a plurality of first lens areas, each having a size and a shape corresponding to two of the plurality of pixel lines, each of the first lens areas distinguished from an adjacent first lens area by a trench, and the second lens array comprises a plurality of second lens areas rounded inward toward a direction away from the first lens array, is the second lens areas being arranged so that centers of the plurality of second lens areas are located to correspond respectively to the trenches of the first lens array.

11. The display apparatus of claim 7, wherein the image processor controls the polarization panel to display an image in a three-dimensional (3D) mode or a two-dimensional (2D) mode, and in the 2D mode the image processor divides an image frame of 2D content into odd-numbered lines and even-numbered lines, generates a first 2D frame by pairing the odd-numbered lines of the image frame, generates a second 2D frame by pairing the even-numbered lines of the image frame and arranges the paired lines of the second 2D frame from the second pixel line, and provides the first 2D frame and the second 2D frame to the display panel in sequence.

12. The display apparatus of claim 7, wherein:

in the 2D mode the image processor divides an image frame of 2D content into odd-numbered lines and even-numbered lines, generates a first 2D frame by pairing the odd-numbered lines of the image frame, generates a second 2D frame by pairing the even-numbered lines of the image frame and arranges the paired lines of the second 2D frame from the second pixel line, and provides the first 2D frame and the second 2D frame to the display panel in sequence.

13. The display apparatus of claim 12, wherein, when the first 3D frame or the first 2D frame is displayed, the polarization panel is turned on to pass a ray of light having the first polarization direction, and when the second 3D frame or the second 2D frame is displayed, the polarization panel is turned off to pass a ray of light having the second polarization direction which is perpendicular to the first polarization direction.

* * * * *